United States Patent [19]

Knobloch et al.

[11] 3,732,257
[45] May 8, 1973

[54] TRIMELLITIC ACID ANHYDRIDE PRODUCT RECOVERY BY STEAM STRIPPING CRUDE ANHYDRIDE OF TOTAL SOLIDS FROM PSEUDOCUMENE OXIDATION EFFLUENT AND CONTINUOUS FRACTIONATION OF STRIPPED PRODUCT

[75] Inventors: James O. Knobloch, Naperville; J. Michael Woollen, Chicago, both of Ill.

[73] Assignee: Standard Oil Company, Chicago, Ill.

[22] Filed: July 1, 1971

[21] Appl. No.: 158,907

[52] U.S. Cl. .............260/346.4, 260/346.3, 203/92, 203/96, 203/99, 203/15, 203/88, 203/79, 203/35
[51] Int. Cl. ......B01d 3/38, C07c 63/02, C07c 63/32
[58] Field of Search......................203/92, 95, 96, 15, 203/88, 79, 35; 260/346.4, 346.3

[56] References Cited

UNITED STATES PATENTS

| | | | |
|---|---|---|---|
| 3,206,475 | 9/1965 | Malo | 260/346.3 |
| 3,261,846 | 7/1966 | Meyer | 260/346.4 |
| 3,161,658 | 12/1964 | Meyer | 260/346.3 |
| 3,484,458 | 12/1969 | Stein et al. | 260/346.4 |
| 3,651,095 | 3/1972 | Jung et al. | 260/346.4 |

Primary Examiner—Wilbur L. Bascomb, Jr.
Attorney—Fred R. Ahlers

[57] ABSTRACT

Fluid effluent from pseudocumene oxidation with molecular oxygen in the presence of acetic acid as reaction medium under liquid phase conditions or concentrate thereof is subject to simultaneous stripping of reaction medium, thermal conversion of its trimellitic acid content to crude trimellitic anhydride and steam stripping at atmospheric pressure followed by continuous fractionation of the crude anhydride to recover product anhydride of improved color and color stability. Such anhydride recovery avoids inefficiency of trimellitic acid recovery from fluid oxidation effluent by crystallization, long residence of crude anhydride at high temperature in batchwise distillation with its attendant double anhydride formation and loss of desired anhydride product.

5 Claims, 3 Drawing Figures

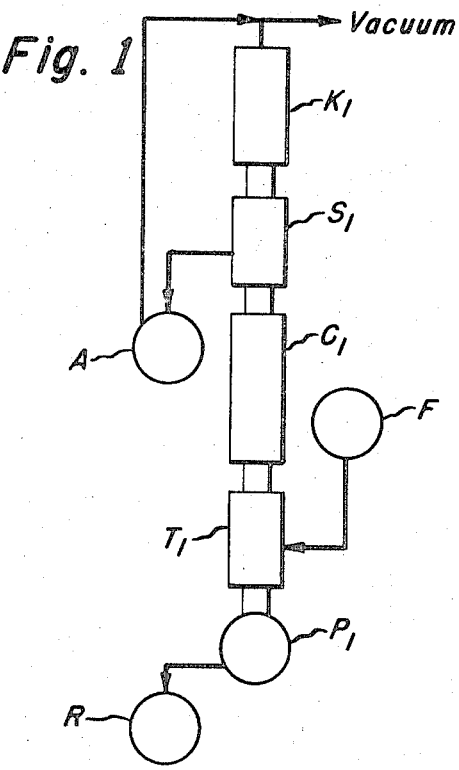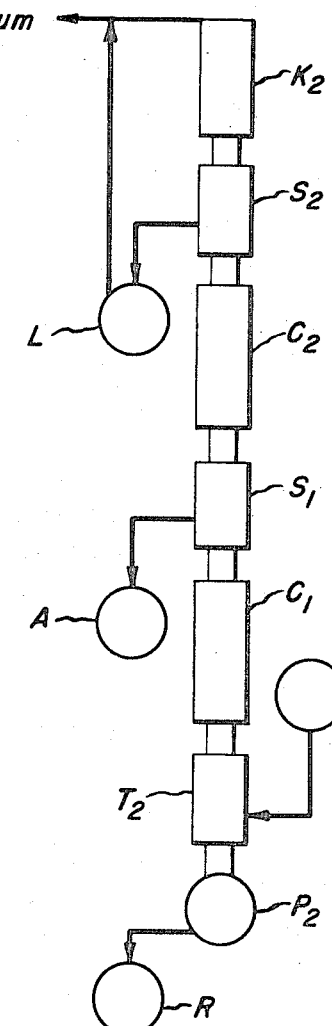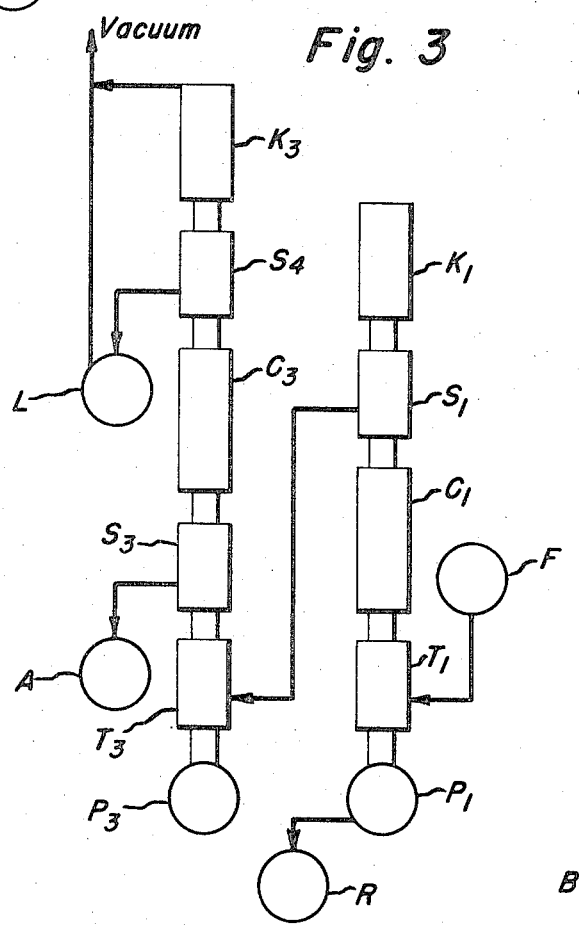

TRIMELLITIC ACID ANHYDRIDE PRODUCT RECOVERY BY STEAM STRIPPING CRUDE ANHYDRIDE OF TOTAL SOLIDS FROM PSEUDOCUMENE OXIDATION EFFLUENT AND CONTINUOUS FRACTIONATION OF STRIPPED PRODUCT

BACKGROUND OF INVENTION

Trimellitic acid is used as its acid anhydride (intramolecular acid anhydride, 4-carboxyphthalic anhydride, hereafter referred to as "TMA") for the commercial preparation of esters, alkyd resins and urethane-like foams or as an intermediate for the 4-acid halide from which poly-(amide-imide) resin can be readily made. Trimellitic acid can be prepared by the oxidation of pseudocumene (1,2,4-trimethylbenzene) with chemical oxidants such as chromic acid, potassium permanganate or nitric acid or with a source of molecular oxygen (e.g., air or oxygen gas). The use of chemical oxidants is costly and introduces impurities requiring special costly means of purification. Catalytic liquid phase oxidation of pseudocumene with molecular oxygen at a temperature of 160°–225°C. in the presence of acetic acid reaction medium and catalysis provided by a source of bromide ion and metals of variable valence (e.g., cobalt, manganese and cerium and mixtures thereof) can be conducted to provide high trimellitic acid yields without the introduction of impurities requiring special purification means under conditions which are commercially feasible and acceptable. Although trimellitic acid so produced has partial oxidation products of pseudocumene and catalyst components as impurities, those impurities can be removed by commercially acceptable process steps.

Such catalytic liquid phase pseudocumene oxidation with molecular oxygen (e.g., air) proceeds in commercially acceptable reaction time to produce substantial, high yields of trimellitic acid with low amounts of formylphthalic acids as intermediate products, and complex by-products when commercial $C_9$ aromatic hydrocarbons containing 90–98 percent pseudocumene and small amounts of mesitylene, xylene isomers and ethyl toluenes are oxidized by said efficient catalytic liquid phase oxidation, also small amounts of trimesic acid and isomeric phthalic acids are produced as co-products. Hereafter "co- and by-product" impurities will be used to collectively refer to the above oxidation intermediates, complex by-products and co-produced trimesic acid and phthalic acids unless otherwise identified.

Many routes have been proposed for the recovery of TMA (trimellitic acid anhydride) product from the fluid oxidation effluent from liquid phase oxidation of pseudocumene. According to one route the effluent containing trimellitic acid is cooled to crystallize trimellitic acid which is recovered in crude form by solid-liquid separation leaving 30–40 percent of the tricarboxylic acid dissolved. According to another route crude trimellitic acid is recovered by flash evaporation or distillation of the reaction medium. Such recoveries of crude trimellitic acid are taught in U.S. Pat. No. 2,971,011 which further teaches thermal dehydration of the crude tricarboxylic acid to crude TMA, selective extraction of TMA from the crude product, color adsorbent treatment of the extract solution followed by recovery of TMA from the decolorized solution by crystallization or evaporation or distillation of extract solvent.

U.S. Pat. No. 3,161,658 teaches treating such acetic acid mother liquors containing dissolved trimellitic acid to recover 65–67 percent of the solute as crude acid anhydride. This is done by charging the acetic acid mother liquor into a melt of TMA to drive off the solvent. A portion of the crude TMA is withdrawn and selectively extracted with a methyl ketone or aromatic hydrocarbon solvent, separating the solution from insolubles and removing the solvent by evaporation or distillation. The partially purified TMA is combined with crystallized trimellitic acid recovered from cooling reaction effluent, preferably after conversion of the tricarboxylic acid to TMA and the total crude TMA is vacuum fractionated batchwise at 1–20 mm Hg. and a final stillpot temperature of up to 280°C.

U.S. Pat. No. 3,261,846 takes another approach to increasing recovery of TMA from its tricarboxylic acid in the oxidation effluent. Such effluent is combined with 0.2 to 10 parts pseudocumene per part on weight basis of total solids in the oxidation effluent and the mixture is distilled in the presence of a strong mineral acid to remove an azeotropic mixture comprising an aqueous phase and pseudocumene phase and a concentrated (95–100 percent) acetic acid fraction. Crude trimellitic acid can now be recovered, dehydrated and fractionated batchwise. With an excess of pseudocumene over that required to remove the water, distillation at a higher temperature in the presence of more strong mineral acid can be conducted to convert trimellitic acid to TMA. The residue is filtered hot to remove insolubles, the hot filtrate, which is a solution of the acid anhydride, is recovered. Partially purified TMA is crystallized at 25°C., recovered, washed with pentane, melted and fractionated to recover TMA product. Washing with pentane or other aliphatic hydrocarbon is necessary to remove pseudocumene because it otherwise distills with fractionated product.

A further approach is disclosed in French Pat. No. 1,556,414. According to this patent the oxidation effluent is distilled at a pressure of 200–760 mm Hg. and a final temperature of 250°–300°C. under an atmosphere of inert gas such as nitrogen. This distillation removes acetic acid reaction medium and converts trimellitic acid to crude TMA. The crude TMA is subjected to vacuum rectification at a pressure of less than 20 mm Hg., preferably 1–20 mm Hg., to a final stillpot temperature raised progressively to 280°C. hence batchwise rectification.

All of the foregoing approaches to TMA product recovery using vacuum fractionation or rectification batchwise must of necessity leave a flowable residue in which TMA provides the flux for high boiling co- and by-products and distribute bromine containing impurities throughout the fractions which limits the quality of TMA product recovered.

Recently an improved technique has been developed for highly efficient recovery of TMA equivalent of trimellitic acid content of the fluid oxidation effluent from catalytic liquid phase oxidation of pseudocumene. Said improvement involves simultaneous removal of acetic acid reaction medium by distillation or evaporation and dehydration of trimellitic acid content of such effluent to provide a crude TMA product which is then subjected to continuous vacuum fractionation. The simultaneous treatments of the fluid oxidation effluent maximizes conversion of trimellitic acid to crude TMA. The continuous fractionation provides high recovery of purified TMA product by minimizing TMA residence at temperatures which favor formation of much higher boiling double anhydride (inter-intraanhydride) representing a loss of potential TMA product. When such an improved TMA recovery is practiced with fluid oxidation effluent which has been obtained from bromine promoted catalysis of heavy metal oxidation catalysts (e.g., Co, Mn, Ce, etc.), the yields of product TMA from continuous fractionation are in fact higher than obtained by other proposed processes but the product TMA has a substantial bromine content which leads to poor initial color and color stability of TMA product held in the molten state.

The present inventive process eliminates crystallization of trimellitic acid from the fluid oxidation effluent, use of selective solvent and color adsorbents, and production of anhydride with poor color and color stability by use of steam stripping when crude anhydride is formed and by continuous vacuum distillation of crude TMA which does not carry forward metal compounds as contaminants and does by a commercially feasible recovery process provide a better quality TMA product.

SUMMARY OF THE INVENTION

Fluid effluent from the oxidation of pseudocumene to trimellitic acid in the presence of a source of heavy metal oxidation catalyst and a source of bromine under liquid phase conditions in an acetic acid reaction medium or a fluid concentrate of said effluent is subjected to distillation or evaporating to removal of reaction medium to a final pressure which can be as low as 100 mm Hg., dehydration of trimellitic acid in the residue total solids to its acid anhydride (TMA) and superheated steam stripping to provide liquid, partially purified crude product. Said dehydration and superheated steams stripping are conducted simultaneously. The liquid partially purified crude TMA is continuously fractionated at an absolute pressure of 1–20 mm Hg. and at a stillpot temperature about 30°–50°C. above TMA boiling point at such pressure, suitably in the range of 225°–295°C. Suitable reflux is maintained to remove not more than 2–5 percent of the crude TMA charge as light overhead (containing materials boiling below TMA) fraction and sufficient flux for bottoms fraction (containing materials boiling above TMA) to maintain it as a flowable fluid at operating stillpot temperature by using a top overhead temperature of just above (5°–10°C. above) TMA melting point. Such bottom fraction residue is fluid at 216.5°C. when containing 50% TMA. Such bottom fraction residue is also fluid at operating stillpot temperature with 5–7% TMA content when a strong mineral acid is used in an amount equivalent to the metal equivalent in crude TMA. By the foregoing TMA recovery technique TMA product of 98–99 percent purity can be recovered in yields of 87–97 percent of the TMA content of the charge to fractionation.

The use of superheated steam for stripping simultaneously with dehydration of the trimellitic acid content of the fluid oxidation effluent is not the same as steam distillation wherein large quantities of steam are used to distill products. But rather such superheated steam stripping differs from steam distillation because less steam is used for such stripping and it is used prior to distillation of TMA product. The present use of superheated steam for stripping causes decomposition of organic impurities, for example phenyl and bromophenyl esters and polyanhydrides. Such esters and polyanhydrides may be illustrated by the following possible generic formula:

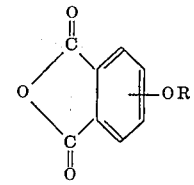

wherein R is phenyl; diphenyl; hydrophenyl; or benzoyl, hydroxybenzoyl and bromobenzoyl as in phenyl esters or in anhydrides with benzoic acid, bromobenzoic acid, hydroxybenzoic acid and the like. Still other ester and polyanhydride impurities not necessarily derivatives of TMA are also decomposed in the same manner. Evidence of the presence of all such foregoing impurities has been detected by mass spectrographic analysis of hydrolysis products of crude TMA. All such ester and anhydride impurities are minor contaminants compared to any one of the aromatic organic impurities before named. Superheated steam stripping to remove 2 to 10 weight percent of the crude TMA from dehydration will cause such removal of a substantial amount of the above impurities. This can be accomplished by the use of steam superheated to a temperature of 230° to 265°C. which is 5° to 15°C. above the dehydration temperature.

The fractionation of TMA in such recovery process differs from the prior TMA recovery processes using batchwise vacuum fractionation wherein the stillpot temperature is increased during fractionation at a pressure of less than 20 mm Hg., for example increased progressively from an initial temperature of 200°–220°C. up to a final temperature of 280°C. to provide a temperature of 180°–200°C. at the top of the fractionation column. The continuous vacuum fractionation, unlike some batchwise vacuum fractionation of crude TMA, need not be conducted under an inert (e.g., nitrogen) atmosphere.

One advantage of the present continuous vacuum fractionation of crude TMA over its prior vacuum batchwise fractionation is the suppression of TMA double anhydride formation (intermolecular anhydride between two molecules of TMA) because, unlike batchwise operation subjecting crude TMA to a temperature of 260°C. and above for long period of time favoring TMA double anhydride formation, continuous operation subjects TMA to temperatures of 260°C. and above only for a short time. Also the recovery of TMA can by continuous vacuum fractionation be improved by either reducing stillpot temperature or shortening the residence time of crude TMA in the stillpot. Batchwise vacuum fractionation is less feasible because only reduction of stillpot temperature can be used to improve TMA recovery. However, with such stillpot temperature reduction there must also be used a lower vacuum pressure. The decrease of vacuum pressure is limited by the pressure drop through the fractionation column. Thus only a relatively short column effective height is useful in batchwise operation limiting the effectiveness of rectification and hence TMA product quality. A fractionating column of relatively greater effective height, for example twice the maximum useful with batchwise operation, can be used with continuous fractionation thus ultimately providing a recovered TMA product of better quality and in better yield.

Previously the deficiencies of batchwise fractionation of crude TMA have been overcome in part by vacuum flashing at 10 to 20 mm Hg. TMA and materials boiling below TMA from said crude; leaving behind a residue of materials boiling higher than TMA. Then the TMA is fractionally condensed to obtain a TMA condensate and uncondensed vapors are discharged or the TMA fraction is condensed and subjected to two simple vacuum (5–10 mm Hg. pressure) distillations in series to recover TMA product as liquid residue. Such processing of crude TMA can be continuous and partially approaches the usefulness and effectiveness of continuous fractionation but there are more apparatus elements needed than when continuous fractionation of crude TMA is conducted following removal of reaction medium from reaction effluent and dehydration of its total solids to crude TMA.

Other advantages of the TMA recovery process of this invention will become apparent from subsequent portions of the description.

The fluid effluents from pseudocumene oxidation operated upon by the present TMA recovery process contain trimellitic acid (TMLA) and, for each 100 parts thereof, 177–336 parts aqueous acetic acid of 9–28 percent water content (thus 91–72 percent acetic acid) and 5–25 parts aromatic organic impurities of the types before mentioned. Such fluid oxidation effluents can be derived from the liquid phase oxidation conducted to a final temperature of 205°–216°C. of a $C_9$ aromatic hydrocarbon feed containing 91–98 weight percent pseudocumene with molecular oxygen (e.g., air) in the presence of 3–5 weight parts of 98–95 percent acetic acid (2–5 percent water) and in the presence of catalysis provided by heavy metal (e.g., Co, Mn, Ce and mixtures thereof) and a source of bromine to provide total metals in the range of 0.01 to 0.05 total gram atoms of metal and 0.01 to 0.05 gram atoms of bromine per mole $C_9$ hydrocarbon feed.

According to the preferred use of the present inventive process, fluid oxidation effluent is flashed to a pressure below the final pressure at said oxidation temperature of 205°–216°C. required to maintain acetic acid in the liquid phase. Flashing to a pressure of 50–70 pounds per square inch gauge remove aqueous acetic acid and partially (80–90 percent) dehydrate TMLA to TMA. The completion of dehydration of TMLA to TMA is then conducted at a temperature of 225° to 250°C. while injecting superheated steam at a temperature of 235° to 265°C. into the residual molten mass in an amount of 2–10 weight percent of the molten mass. Such steam stripping and concurrent dehydration completion can be conducted at a pressure in the range of 700 to 800 mm Hg. This steam stripping removes 2 to 10 weight percent of the organic components from the molten mass which removed organic components have a substantial amount of the original bromine containing impurities.

The partially purified crude TMA is then used as feed for the continuous fractionation hereafter described in detail.

To assist the understanding of the continuous vacuum fractionation step for obtaining TMA product from partially purified crude TMA from dehydrated steam stripped total solids content of fluid reaction effluent from pseudocumene oxidation with molecular oxygen in the presence of heavy metal oxidation catalyst and a source of bromine under liquid phase conditions, a schematic representation of three embodiments of suitable apparatus will be presented.

DESCRIPTION OF THE DRAWING

The accompanying drawing illustrates in schematic manner three embodiments: FIG. 1, FIG. 2 and FIG. 3, of apparatus suitable for continuous vacuum fractionation of partially purified crude TMA to obtain TMA product.

The schematically indicated elements of said vacuum fractionation apparatus are each identified by letter according to the "KEY" to those letter identification designations. The letter S is used to identify a reflux splitter, C is used to identify column rectification member which can be packed column or plate-containing column section, K is used to identify condenser member, T is used to identify column stripping member, packed or plate-containing, into which crude TMA is fed, P is used to identify the column's stillpot, F is used to identify liquid, partially purified crude TMA feed supply, L is used to identify light ends condensate receiver, A is used to identify TMA product receiver, and R is used to identify residue receiver. To maintain operating pressure vacuum is applied from source of same as shown for each embodiment.

For actual design of such an apparatus for continuous fractionation numerous suitable specific apparatus elements designated by the letter KEY can be devised and used. Hence, their schematic block representation is used rather than any particular design for an individual element. Said nine apparatus elements can be arranged to provide a variety of configurations for fractionation application according to the continuous vacuum fractionation operation of this invention.

The simplest arrangement of said elements of apparatus providing a suitable fractionation column configuration is shown in FIG. 1. Liquid, partially purified crude TMA from feed tank F is introduced into stillpot $P_1$, by way of feed section of stripping section of a relatively short or low plate containing column having the efficiency of at least that of a 5-plate Oldershaw column. The system is operated at total reflux until equilibrium conditions are attained in the composite column comprising stripping member $T_1$ having feed plate, rectification member $C_1$, reflux splitter $S_1$ and condenser $K_1$, cooled to condense TMA and light ends not removed by steam stripping, through which the operating pressure is maintained from vacuum source as shown. Thereafter liquid crude TMA is introduced continuously from supply $F_1$ to feed plate in stripping member $T_1$; reflux splitter $S_1$, is set to take liquid TMA as total overhead product. Residue, a mixture of materials boiling higher than TMA with some TMA for fluidity of the mixture, is continuously withdrawn as bottoms fraction from stillpot $P_1$, into residue receiver $R_1$.

FIG. 2 illustrates by schematic block representation a more efficient, fractionation column configuration embodiment and provides a separation of remaining light ends from TMA product. In this embodiment there are used two consecutive relatively short or low-plate containing columns each of the efficiency of a 5-plate Oldershaw column. For the purposes of this description two of such 5-plate columns $C_1$ and $C_2$ separated by reflux splitter $S_1$ with reflux splitters $S_2$ between condenser $K_2$ and top of column $C_2$. Feed plate in stripping section $T_2$ is shown separately but is an integral part of column $C_1$ which functions as the stripping section of the fractionation composite. Column $C_2$ functions as the rectification section of the fractionation composite. Light ends not removed by steam stripping, and TMA product, are removed from the fractionation composite as liquids by splitters $S_2$ and $S_1$ respectively, which control both reflux ratio and ratio between quantities of light and heavy overhead fractions. Product receiver A includes a constricted by-pass line to equalize pressure in receiver A to that of adjacent top section of column $C_1$ preventing pressure buildup in receiver A which would prevent liquid flow thereto from splitter $S_1$. Escape of vapor from the column into receiver A is prevented by the slight pressure differential across constriction while collecting liquid TMA product. Vacuum to maintain operating pressure is imposed through light end receiver L and condenser $K_2$ from source of a vacuum as shown. No by-pass is needed for receiver L. In the use of this embodiment only a small protective cold trap is required between light ends receiver L and vacuum system.

Condenser $K_2$ is operated at a temperature to condense light ends. After equilibrium conditions are established in the system, liquid partially purified crude TMA is continuously fed from feed supply F to feed plate $T_2$ of column $C_1$, liquid TMA is continuously removed by splitter $S_1$ and collected in TMA product receiver A, remaining liquid light ends are continuously removed by splitter $S_2$ and collected by light ends receiver L and residue (materials boiling higher than TMA) is continuously removed from stillpot $P_2$, with some TMA to provide fluid residue and collected in residue receiver R.

FIG. 3 illustrates a more elaborate composite fractionation configuration embodiment and comprises the simplest system of FIG. 1 on the right from which the total overhead liquid fraction from splitter $S_1$ is fed to feed plate $T_3$ of reboiler stillpot $P_3$ of the additional portion of the system on the left. Vapors from said feed plate $T_3$ pass upwardly through splitter $S_3$ contacting liquid from rectification column $C_3$. Splitter $S_3$ removes TMA product to product receiver A which contains the constricted by-pass as described in connection with FIG. 2 and for the same reasons. Operating pressure for the right and left portions is attained by vacuum applied to light ends receiver L and condenser $K_3$ as shown. Again no by-pass need be used. Condenser $K_1$ is operated at a temperature to condense a mixture of light ends and TMA and condenser $K_3$ is operated at a temperature to condense light ends. Column $C_3$ separates residual light impurities (not removed by steam stripping) from TMA product.

The advantage of the use of the more elaborate composite fractionation configuration of FIG. 3 is that through the use of three splitters $S_1$, $S_3$ and $S_4$ different reflux ratios in columns $C_1$ and $C_2$ can be maintained and, when desirable, more efficient separation of impurities can be effected.

OPERATING CONDITIONS FOR FRACTIONATION

Partially purified crude TMA from simultaneous dehydration (thermal conversion of trimellitic acid to TMA) and steam stripping of total solids contents of pseudocumene oxidation with molecular oxygen under liquid phase conditions is liquid at a temperature of 160°–165°C. Liquid partially purified crude TMA as feed supply F in the drawing figures is maintained at operating pressure at a temperature above such melting point temperature. TMA double anhydride formation is relatively slow at 225°C., taking more than 6 hours, but it becomes faster at higher temperatures, e.g., 3–4 hours at 260°C. Hence, a molten supply of liquid crude TMA in feed supply F can be maintained for residence time of up to 3–3 hours at 165°–225°C. without significant loss of TMA to much higher boiling TMA double anhydride. A crude TMA feed at 200°–210°C. is advantageous because at such temperatures the viscosity of the liquid crude TMA provides a free flowable liquid feed.

Because the residence time of TMA in the stillpot or reboiler stillpot, when such is used in FIG. 3, is relatively short, the temperature in the stillpot or reboiler stillpot can for operating pressures of suitably 5–20 mm Hg., desirably 8–15 mm Hg. and preferably 10–12 mm Hg. can be as high as 300°C. Conveniently the stillpot or reboiler stillpot temperature can be 30° to 50°C. above TMA boiling point at operating pressures of 5–20 mm Hg. For example a stillpot and reboiler stillpot temperature can be 270°–280°C. when operating at a pressure of 9–11 mm Hg. Minimizing size of the stillpot and reboiler stillpot to assist in maintaining low TMA residence at temperatures otherwise favoring TMA double anhydride formation presents a heat transfer problem for providing suitable uniform boil-up rate, but this problem can be overcome by the use of mechanical agitation of fluid contents of such stillpots.

The condensers $K_1$ in FIG. 2, $K_2$ in FIG. 2 and $K_1$ and $K_3$ in FIG. 3 can be operated at a temperature from that at which the condensate is just liquid up to the maximum for just condensing the vapors entering the condensers. It is preferred to operate those condensers at the lowest temperature at which a liquid condensate is obtained, that is, just above condensate incipient freeze point so no solids are present in the condensate. For example condensers $K_2$ in FIG. 2 and $K_1$ and $K_3$ in FIG. 3 are preferably operated at coolant temperatures of 160°–165°C.

Operating conditions for the liquid splitters controlling both the reflux ratio and ratio between quantities of removed light ends and TMA product fractions are determined by the mole fraction of TMA and materials boiling below TMA (i.e., light ends) in the feed. For any known crude TMA composition and selected pressure of operation and stillpot temperature for boil-up, the approximate reflux ratio and ratio between light ends and TMA product fractions can be estimated by calculations employing the usual fractionation calculation approximation techniques. More precise determinations can be made on the basis of those calculated approximations by operations at selected conditions within the calculated parameters conducted with readily available laboratory scale apparatus, for example 5 or 10-plate glass Oldershaw columns with auxiliary apparatus in the fractionation composites indicated in FIG. 1, 2 and 3 of the accompanying drawing and the description of such composits before given in reference to said drawing figures.

High temperatures and relatively high temperature freeze point liquids are involved in all elements comprising the various composite fractionation configurations, e.g., those of FIG. 1, 2 and 3 of the drawings. Thus temperature maintenance of individual elements of apparatus by insulation and/or heat tracing thereof is essential to prevent heat losses causing solids deposition and to provide the liquid-vapor equilibrium necessary for the separations by stripping and rectification sections of the fractionation. For small scale laboratory operation to establish precise conditions for larger scale operation as mentioned above, the small scale fractionation apparatus composite can be conveniently assembled in a thermally insulated and controlled electrically heated (e.g., by 1,100 watt air heating elements to about 175°C.) chamber of about 9 feet high, 3 feet wide and 1.5 feet deep. Vacuum jacketing of the elements of the composite will prevent temperature fluctuations occurring when the chamber is opened during operation of the apparatus.

COMPARATIVE PROCESS

The composite illustrated by FIG. 2 of the drawing is employed. Each of the columns $C_1$ and $C_2$ are 5-plate containing distillation columns having the efficiency of a 5-plate Oldershaw column. The crude TMA feed used was obtained from fluid effluent from $C_9$ aromatic hydrocarbon oxidation effluent flashed to remove aqueous acetic acid and dehydrate 85% TMLA to TMA and then further dehydrated to complete conversion of TMLA to TMA without steam stripping. Such crude TA feed was brown and had the following composition:

| Feed Component | Component Weight Percent |
|---|---|
| TMA | 90.5 |
| Benzoic Acid | 0.114 |
| o-Toluic Acid | 0.013 |
| o-Phthalic Acid | 0.397 |
| Iso- and Terephthalic Acids | 0.891 |
| Methyl Phthalic Acids | 0.542 |
| Trimesic Acid | 0.072 |
| Pyromellitic Acid | 0.123 |
| Trimellitic Aldehyde | 0.230 |
| Total Bromine (1) | 0.233 |
| Total Metals (2) | 0.704 |

(1) Total Bromine includes bromine per se in brominated impurity and bromide compounds wherein bromide ion is 7–8 percent of the total bromine.
(2) Total metals as metals per se in metal salts.

Total bromine containing compounds and metal salts comprise about 7.1 percent of feed.

To start the continuous fractionation operation feedpot F is filled with liquid crude TMA maintained at 198°–199°C. throughout continuous operation. Condenser $K_2$ is maintained at 158°–159°C. by circulating therethrough heat transfer fluid heated to 158°–159°C. The vacuum source to provide operation at 10 mm Hg. is started and the system is checked and tightened to be made leak free (vacuum tight). Liquid feed is introduced on feedplate T and feedpot $P_2$ stirrer is started. Stillpot $P_2$ is now heated. The system is operated at total reflux to line out operating temperatures, particularly stillpot $P_2$ temperature which will increase as pressure drop in column increases as the trays become covered with liquid thus causing temperature in stillpot $P_2$ to increase. Fortunately as reflux is established heat input to stillpot $P_2$ can be adjusted to attain control of its temperature. Also decrease in feed rate or feed at too low selected initial rate will cause temperature of stillpot $P_2$ to increase. Dumping of feed through valve sticking open will cause stillpot $P_2$ temperature to fall below selected temperature followed by gradual recovery. A plug in the vacuum system will cause a pressure rise in column and steady temperature rise in both stillpot $P_2$ and condenser $K_2$. These initial temperature control difficulties each have a distinct and different effect which make precise identification and ready correction of the problem possible, and thus permit quick attainment of lined out operating conditions or rapid recovery from problems.

Operation at full reflux for a short time after lined out temperature conditions are established should be practiced during start up before residue draw off and liquid splitters $S_1$ and $S_2$ are set in operation, in spite of fact that this results in accumulation of light end materials (compounds boiling below TMA) in the column and nonrepresentative initial TMA product contaminated with said light ends. Such initial TMA product not representative of ultimate product does not present a serious problem because either a small amount of light ends enriched in TMA can be taken before collecting TMA product or a small amount of TMA product contaminated with light ends can be first taken and gradually recycled with fresh crude TMA feed. Now continuous collection of light ends in its receiver L, TMA product in its receiver A and residue in its receiver R are commenced at the determined rates for constant feed rate. Final adjustment of liquid splitters $S_1$ and $S_2$ and draw off to residue receiver R can be made by adjustment of calibrated volume flow to assure that conditions favorable for recovery of desired TMA product quality are being met.

Crude TMA before described is used as feed for continuous vacuum fractionation conducted at 9.9 mm Hg. pressure at the following conditions:

| | Temperature: |
|---|---|
| Liquid splitter $S_2$ | 235°C. |
| TMA product splitter $S_1$ | 250°C. |
| Stillpot $P_2$ | 275°C. |
| Feedpot F | 198°–199°C. |
| Heat exchange liquid to condense $K_2$ | 158°–159°C. |
| Liquid splitter Operation | Seconds closed:Seconds open |
| Light ends splitter $S_2$ | 15:0.75 |
| TMA product splitter $S_1$ | 3:2 |

Analysis of recovered light ends, TMA product and residue withdrawn are as follows:

| Component | Light ends | Product | Residue |
|---|---|---|---|
| TMA | * | 98.8 | * |
| Benzoic Acid | 0.26 | <0.003 | <0.003 |
| o-Toluic Acid | 0.015 | 0.004 | 0.026 |
| o-Phthalic Acid | 0.25 | 0.012 | 0.003 |
| Iso- and terephthalic Acids | 1.07 | 0.90 | 1.05 |
| Methyl Phthalic Acids | 0.62 | 0.14 | 0.22 |
| Trimesic Acid | 0.088 | 0.045 | 0.47 |
| Pyromellitic Acid | <0.003 | <0.003 | <0.003 |
| Trimellitic Aldehyde | * | 0.024 | * |
| Total Bromine | 0.77 | 83 ppm | 0.21 |
| Total Metals | 15 ppm | <10 ppm | 1.76 |

| | | |
|---|---|---|
| Initial Color 210°F. Molten Color 210°F. | * | 700/800 |
| after 2 hours | * | 700/800 |

\* Not Determined

During collection of 451 weight parts of TMA product of 98.8 percent purity, there were also collected 26 parts light ends and 66 parts residue, both by weight. Deducting TMA in column hold up from TMA charged in feed during this period of operation, the TMA in recovered product amounted to 86 weight percent recovery. The TMA content of residue was about 50 percent, which amounted to 6.37 percent of the TMA in the feed not held up in column.

The 50% TMA content of the residue was necessary to obtain a flowable liquid residue. However, a flowable liquid residue can be obtained with 10 weight percent TMA content provided a strong mineral acid, e.g., sulfuric acid or phosphoric acid is added to stillpot $P_2$ in an amount of from 1–3 equivalents of strong mineral acid per equivalent of metal in the residue. This in turn would provide more TMA for recovered product so that TMA recovery would be about 95–96 percent.

SPECIFIC EMBODIMENT OF THE INVENTION

Fluid $C_9$ aromatic hydrocarbon oxidation effluent is obtained at 205°–215°C. of the composition before described and at a pressure of 200–220 pounds per square inch gauge (p.s.i.g.). This effluent is flashed to a pressure of 50–70 p.s.i.g. whereat 80–90 percent of the TMLA content of the effluent is converted to TMA at a temperature of 225°–235°C. The liquid residue is heated to a temperature of 230°–250°C. and superheated steam at 235°–260°C. is injected into the liquid while completion of conversion of TMLA to TMA is accomplished and 6–8 percent of the liquid organic mass is taken overhead.

The resulting partially purified crude TMA is used as feed in the before described continuous fractionation. The product TMA has a bromine content of only 10–20 ppm instead of the 83 ppm of the product from the Comparative Continuous Fractionation. The TMA product recovery amounts to about 86 percent of TMA equivalent of TMLA in the oxidation effluent.

The initial color of molten TMA product recovered according to the process of the above specific embodiment of this invention will be at 210°C. in the range of 80 to 125 as determined by comparison against APHA (HAZEN) Color Standards and after 2 hours at 210°C., the product color determined against the same color standard is in the range of 200 to 400. Such initial and 2 hour molten colors are substantial improvements over the initial and 2 hour molten colors of TMA product from the comparative example.

As mentioned above the TMA recovery can be increased to 95–96 percent of TMLA equivalent in the oxidation effluent by the use of strong mineral acid added to stillpot $P_2$ in an amount of 1–3 equivalents per equivalent of metals in the partially purified crude TMA feed.

Advantageously the crude TMA to be subjected to continuous vacuum fractionation is obtained from fluid oxidation effluent produced by oxidation pseudocumene with molecular oxygen (e.g., air or oxygen gas or mixtures thereof) to trimellitic acid in the presence of acetic acid reaction medium under liquid phase conditions at temperatures in the range of 190°–220°C. in the presence of polyvalent-transition metals (e.g., Co, Mn, Ce and mixtures of two or all thereof) and a source of bromine. The fluid oxidation effluent is stripped of acetic acid reaction medium to provide total solids of the effluent and said total solids containing trimellitic acid is converted thermally to TMA to provide the crude TMA. The stripping of acetic acid reaction medium and said thermal conversion of trimellitic acid to crude TMA can be done as separate steps, or in a single step. To make use of sensible heat in the fluid oxidation effluent and evaporation by depressurizing to atmospheric pressure to remove acetic acid reaction medium, the fluid oxidation effluent at its elevated temperature and pressure can be injected into liquid crude TMA and the vapors boiled up from the surface of crude TMA liquid are conducted through a reflux-condenser which condenses TMA as a liquid providing separation of vapor mixture of acetic acid and water as feed for distillation recovery of high concentration (95–98 percent) acetic acid for recycle to oxidation. A more preferred means for accomplishing this is to concentrate the fluid oxidation effluent by removal of a portion of acetic acid reaction medium in a flash drum operated at a pressure above atmospheric pressure but below oxidation pressure and inject the concentrate into liquid crude TMA at atmospheric pressure and reflux back to it TMA condensate from vapors generated therefrom. This provides better control of TMA leaving the liquid crude TMA and minimizes TMA carried to acetic acid recovery. In either case after removal of acetic acid, the crude TMA is subjected to steam stripping.

The following examples illustrate the above preferred treatment of fluid oxidation to obtain crude TMA and its continuous vacuum fractionation for TMA product recovery.

EXAMPLE 1

A $C_9$ aromatic hydrocarbon feedstock containing 91 percent by weight pseudocumene is oxidized with air at 205°C. and 325 p.s.i.g. (pounds per square inch gauge pressure) in the presence of three weight parts of 97 percent acetic acid (3 percent water) per weight part $C_9$ feedstock and 0.23 weight percent total of cobalt and manganese (calculated as metals but added as their acetate tetrahydrates) and 0.3 weight percent bromide ion from bromine source, respectively, concentrations in acetic acid. Such oxidation produces 1.35 weight parts trimellitic acid per weight part $C_9$ aromatic feedstock and a fluid oxidation effluent containing aqueous acetic acid of 85.5 percent acetic acid and 14.5 percent water by weight and for each 100 parts thereof 36.5 parts trimellitic acid, 1.18 parts total of oxidation co- and by-products and 0.12 part of metal catalyst components.

Such fluid oxidation effluent at 205°C. and 325 p.s.i.g. at 518.8 pounds per hour is injected into 456 pounds of liquid crude TMA at a temperature of 230°C. in a stripping-dehydrating vessel having a reflux condenser operated at 170°C. (TMA melts at 168°C. at atmospheric pressure). Superheated steam at 235°C. is injected into the molten mixture. Acetic acid vapor and water vapor (from aqueous acetic acid medium of effluent and water from trimellitic acid conversion to TMA and superheated steam) are conducted to recovery of acetic acid of 97 percent concentration by distillation. Light boiling organic materials amounting to about 5 percent of the crude TMA are stripped out by the steam. Liquid crude TMA at 121 pounds per hour (equivalent in weight to crude TMA in effluent charged) are withdrawn from said stripping-dehydrating vessel and are charged to feedpot F previously described for operation according to FIG. 2 to supply feed for continuous vacuum fractionation.

Sulfuric acid in an amount of 1.8 equivalents per metal equivalent in the crude TMA is also added continuously to feedpot F. The continuous vacuum fractionation conducted at 9.9 mm Hg. with stillpot $P_2$ at 275°C. and the other specific temperature conditions of operating condenser $K_2$, liquid splitters $S_1$ and $S_2$ are again employed. TMA product of 10–20 ppm bromine content and initial color of 80–100 APHA and 2 hour molten color of 350–400 is recovered in receiver A is at a rate of 110 pounds per hour.

EXAMPLE 2

The fluid oxidation effluent from oxidation of $C_9$ aromatic hydrocarbon feedstock of 98 percent pseudocumene content with air at 210°C. and 350 p.s.i.g. in the presence of 3.5 parts 97 percent acetic acid per part feedstock, 0.47 percent total metals and 0.3 percent bromide ion concentrations in the acetic acid. The fluid oxidation effluent contains 1.6 parts trimellitic acid per part $C_9$ aromatic hydrocarbon. The fluid oxidation effluent at 210°C. and 350 p.s.i.g. provides 132 pounds per hour trimellitic acid with oxidation co- and by-products and metal compounds as impurities. The fluid oxidation effluent is first charged to a flash drum operated at 40 p.s.i.g. to flash off part of the acetic acid and water contained therein. The concentrate is injected into a stripping-dehydration vessel having a TMA reflux condenser operated at atmospheric pressure with 450 pounds liquid crude TMA at 220°C. Superheated steam at 240°C. is injected to remove light boiling organics in an amount of about 8 percent of the concentrate. Liquid crude TMA at 220°C. with a TMA content of 121 pounds per hour is withdrawn from the stripping-dehydrating vessel to supply partially purified crude TMA feed for continuous vacuum fractionation conducted at 9.9 mm Hg. in the manner before specifically described, but without addition of strong mineral acid to stillpot $P_2$.

TMA product may thus be recovered at the rate of 104 pounds per hour in TMA receiver A which is 86 percent of TMA charged to the vacuum fractionation. Such TMA product has a bromine content of 10–20 ppm and good initial and 2 hour molten color. Residue in its receiver R contains about 50% TMA.

The invention claimed is:

1. A method of recovery of trimellitic acid anhydride product of trimellitic acid content of fluid oxidation effluent derived from liquid phase oxidation of $C_9$ aromatic hydrocarbon feed containing 91–98 weight percent pseudocumene with air in the pressure of 3–5 weight parts of 95–98 percent acetic acid per part of said aromatic hydrocarbon and catalyst provided by 0.005 to 0.01 total gram atoms of heavy metal oxidation catalyst and 0.01 to 0.05 gram atoms of bromine per mole of said aromatic hydrocarbon at a final temperature in the range of 205° to 215°C., which process consists of the sequence of steps each conducted continuously:

a. removing substantially all acetic acid from said fluid effluent thereby forming a concentrate thereof;

b. simultaneously dehydrating trimellitic acid to said acid anhydride at a temperature in the range of 225° to 250°C. and removing bromo-organic impurities by injecting superheated steam which is at a temperature in the range of 230° to 265°C. to remove 2 to 10 percent of organic oxidation co- and by-products boiling below said anhydride and obtain a partially purified and liquid crude trimellitic acid anhydride;

c. vacuum fractionation of the partially purified and liquid anhydride in a stripping zone and a rectification zone conducted at an absolute pressure of 1 to 20 mm Hg., a bottom temperature 30°–50°C. above the boiling point of trimellitic acid anhydride at such pressure, and a top temperature at about the melting point of trimellitic acid anhydride and removing materials boiling below trimellitic acid anhydride as a liquid overhead fraction, liquid trimellitic acid anhydride product as a lower fraction from the rectification zone and removing materials boiling above trimellitic acid anhydride as a fluid bottom fraction before the stripping zone.

2. The method of claim 1 wherein the fractionation is conducted at an absolute pressure of 9 to 11 mm Hg., a bottom temperature of 270° to 280°C. and a top temperature of 160° to 165°C.

3. The method of claim 2 wherein sulfuric acid or phosphoric acid is combined with the liquid and partially purified crude trimellitic acid anhydride in an amount of 1 to 3 equivalents per equivalent of metals in said liquid crude anhydride before subjecting it to vacuum fractionation.

4. The method of claim 1 wherein the removal of acetic acid, the dehydration of trimellitic acid and the removal of bromo-organic impurities by superheated steam stripping are all conducted simultaneously.

5. The method of claim 1 wherein step (a) is conducted by flash stripping acetic acid from the fluid oxidation effluent and 80 to 90 percent of trimellitic acid is converted to its acid anhydride at a temperature of 227° to 238°C. and a pressure of 50 to 70 p.s.i.g. leaving a crude mixture of trimellitic acid and trimellitic acid anhydride and then completing the conversion of trimellitic acid to its acid anhydride by introducing said crude mixture into a molten pool of partially purified crude trimellitic anhydride into which the superheated steam is injected.

* * * * *

UNITED STATES PATENT OFFICE
CERTIFICATE OF CORRECTION

Patent No. 3,732,257　　　　　　　Dated May 8, 1973

Inventor(s) JAMES O. KNOBLOCH, ET. AL.

It is certified that error appears in the above-identified patent and that said Letters Patent are hereby corrected as shown below:

| | | |
|---|---|---|
| Column 6, line 24: | The letter -- S -- | should be in quotes |
| " 6, line 25 | " " C | " " " " |
| " 6, line 27 | " " K | " " " " |
| " 6, line 30 | " " P | " " " " |
| " 6, line 32 | " " L | " " " " |
| " 6, line 33 | " " A | " " " " |
| " 6, line 34 | " " R | " " " " |

Column 8, line 21: "3-3 hours" should be -- 2-3 hours --

Column 8, line 45: First occurrence of FIG. 2 should read -- FIG. 1 --

Column 13, line 60: "pressure" should be --presence --.

Signed and sealed this 22nd day of January 1974.

(SEAL)
Attest:

EDWARD M. FLETCHER, JR.　　　　　RENE D. TEGTMEYER
Attesting Officer　　　　　　　　Acting Commissioner of Patents